US012416876B2

(12) United States Patent
Ozawa et al.

(10) Patent No.: US 12,416,876 B2
(45) Date of Patent: Sep. 16, 2025

(54) STRUCTURE AND IMAGE FORMING APPARATUS

(71) Applicant: KYOCERA Document Solutions Inc., Osaka (JP)

(72) Inventors: Hiroki Ozawa, Osaka (JP); Koichiro Tsujimoto, Osaka (JP); Yoshiki Aoyama, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 18/735,708

(22) Filed: Jun. 6, 2024

(65) Prior Publication Data

US 2024/0411238 A1 Dec. 12, 2024

(30) Foreign Application Priority Data

Jun. 8, 2023 (JP) ................................ 2023-094456

(51) Int. Cl.
*G03G 15/01* (2006.01)
*G03G 15/20* (2006.01)

(52) U.S. Cl.
CPC ..... *G03G 15/0142* (2013.01); *G03G 15/2064* (2013.01)

(58) Field of Classification Search
CPC .................................................. H04N 1/40037
USPC .......................................................... 399/110
See application file for complete search history.

(56) References Cited

U.S. PATENT DOCUMENTS 5,423,604 A * 6/1995 Chern ................. A47B 47/005 312/265.5
6,259,872 B1 * 7/2001 Fukunaga ............. G03G 15/00 399/110

FOREIGN PATENT DOCUMENTS

JP 2000138470 A 5/2000
JP 3566115 B2 * 9/2004

* cited by examiner

*Primary Examiner* — Quana Grainger
(74) *Attorney, Agent, or Firm* — Alleman Hall & Tuttle LLP

(57) ABSTRACT

Each of four outer side surfaces of each of a plurality of square pipes include a groove portion formed along a longitudinal direction of each of the plurality of square pipes and a pair of ridge line portions forming edge portions on both sides of the groove portion. An additional member includes a contact plane which is a plane in contact with a portion of the plurality of square pipes. The additional member is fixed to a plurality of first target pipes which are some of the plurality of square pipes with the contact plane in contact with at least one of the pair of ridge line portions, or the additional member is fixed to a second target pipe which is one of the plurality of square pipes with the contact plane in contact with the pair of ridge line portions.

4 Claims, 5 Drawing Sheets

STRUCTURE AND IMAGE FORMING APPARATUS

INCORPORATION BY REFERENCE

This application is based upon and claims the benefit of priority from the corresponding Japanese Patent Application No. 2023-094456 filed on Jun. 8, 2023, the entire contents of which are incorporated herein by reference.

BACKGROUND

The present disclosure relates to a structure including a plurality of joined square pipes, and an image forming apparatus including the structure.

The image forming apparatus includes a sheet feed portion, a printing portion, a developer container, and the like. The image forming apparatus further includes a structure that supports the sheet feed portion, the printing portion, and the developer container.

For example, it is known that the structure includes a plurality of square pipes joined by welding. The structure having such a configuration has high strength.

SUMMARY

A structure according to an aspect of the present disclosure includes a plurality of joined square pipes and an additional member attached to a portion of the plurality of square pipes. Four corner portions of each of the plurality of square pipes include three first corner portions formed by bending a single metal plate, and one second corner including two edge portions of the metal plate and a welded portion where the two edge portions are joined. Each of four outer side surfaces of each of the plurality of square pipes includes a groove portion formed along a longitudinal direction of each of the plurality of square pipes and a pair of ridge line portions forming edge portions on both sides of the groove portion. The additional member has a contact plane which is a plane in contact with a portion of the plurality of square pipes. The additional member is fixed to the plurality of first target pipes with the contact plane in contact with at least one of the pair of ridge portions in each of the plurality of first target pipes which are some of the plurality of square pipes, or the additional member is fixed to the second target pipe with the contact plane in contact with the pair of ridge portions in the second target pipe which is one of the plurality of square pipes.

An image forming apparatus according to another aspect of the present disclosure includes the structure and a printing portion mounted on the structure and configured to form an image on a sheet.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. It is noted that the following embodiment is an example of embodying the present disclosure and does not limit the technical scope of the present disclosure.

[Configuration of Image Forming Apparatus 10]

Figure 1:
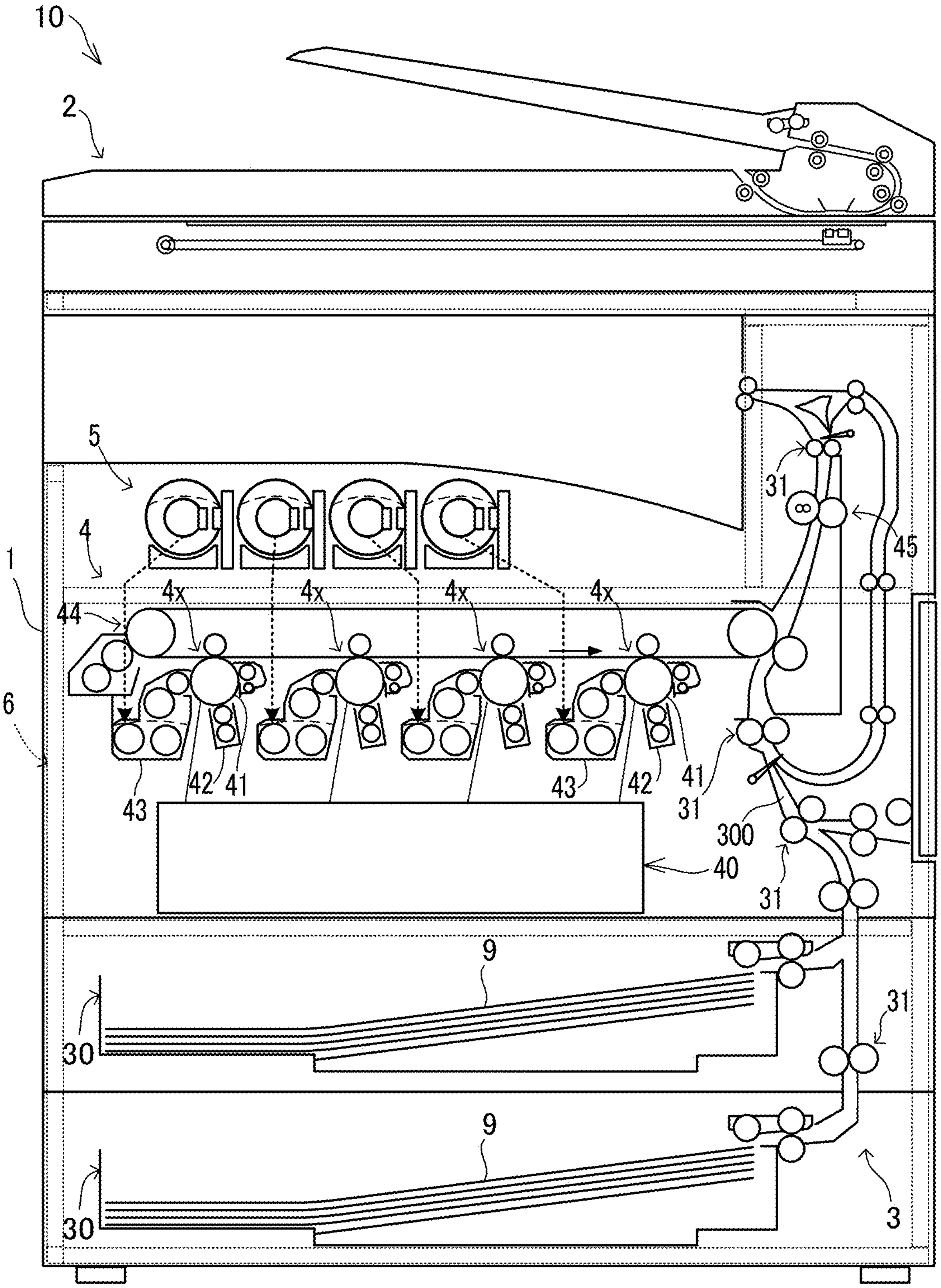
FIG. 1 is a configuration diagram of an image forming apparatus including a structure according to an embodiment.

A structure 6 according to the embodiment is employed in an image forming apparatus 10. As shown in FIG. 1, the image forming apparatus 10 includes a main body unit 1 and an image reading unit 2.

The main body unit 1 includes a sheet feed portion 30, a paper sheet conveying device 3, a printing portion 4, one or more developer containers 5, and a structure 6. The image reading unit 2 is connected to the top of the main body unit 1. The image reading unit 2 is a device that reads an image of a document sheet.

The sheet feed portion 30 is a device that stores a plurality of paper sheets and feeds the stored paper sheets one by one to a paper sheet conveying path 300. The paper sheet conveying device 3 includes a plurality of conveying roller pairs 31 that convey the paper sheet along the paper sheet conveying path 300.

The printing portion 4 is a device that forms an image on the paper sheet supplied from the sheet feed portion 30 through the paper sheet conveying device 3. In the example shown in FIG. 1, the printing portion 4 forms an image on the paper sheet using an electrophotographic method. The paper sheet is an example of the sheet.

The electrophotographic printing portion 4 includes a laser scanning unit 40, one or more image forming portions 4*x*, a transfer device 44, and a fixing device 45.

In the example shown in FIG. 1, the printing portion 4 is a tandem type color image printing device. Therefore, the printing portion 4 includes four image forming portions 4*x* corresponding to four color toners of yellow, cyan, magenta, and black. The image forming apparatus 10 further includes four developer containers 5 corresponding to the four image forming portions 4*x*.

In each of the image forming portions 4*x*, a drum-shaped photoconductor 41 rotates, and a charging device 42 charges the outer peripheral surface of the photoconductor 41. Further, the laser scanning unit 40 writes an electrostatic latent image on the outer peripheral surface of the photoconductor 41, and a developing device 43 develops the electrostatic latent image into a toner image.

Furthermore, in the transfer device 44, an intermediate transfer belt rotates in contact with the four photoconductors 41, and four primary transfer devices corresponding to the four image forming portions 4*x* each transfer the toner image onto the intermediate transfer belt. Further, a secondary transfer device transfers the toner image on the intermediate transfer belt to the paper sheet being conveyed along the paper sheet conveying path 300.

The fixing device 45 heats and presses the toner image on the paper sheet to fix the toner image on the paper sheet. The paper sheet conveying device 3 discharges the paper sheet with the image formed thereon from the paper sheet conveying path 300.

Each of the developer containers 5 supplies toner to the corresponding developing device 43 in the printing portion 4. The toner is an example of the developer. It is noted that the printing portion 4 may be a device that forms an image on the paper sheet by an inkjet method or another method.

The sheet feed portion 30, the paper sheet conveying device 3, the printing portion 4, and the developer containers 5 are attached to the structure 6. The image reading unit 2 is connected to the top of the structure 6.

Figure 2:
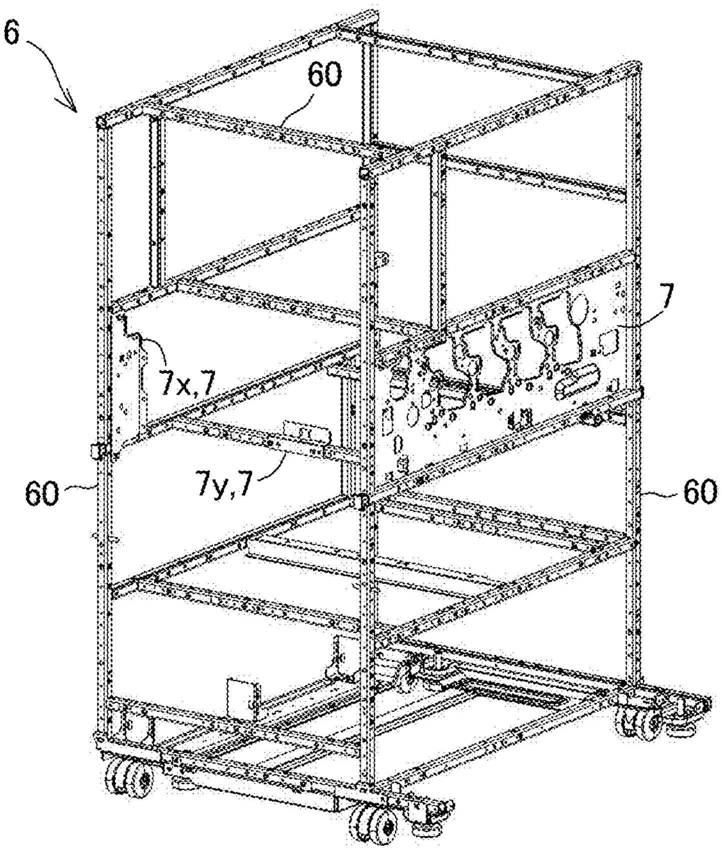
FIG. 2 is a perspective view of the structure according to the embodiment.

The structure 6 includes a plurality of joined square pipes 60 (see FIG. 2). In the structure 6, a plurality of metal square pipes 60 are joined by welding. Such a structure 6 has high strength.

By the way, a general square pipe is manufactured by bending a single metal plate and a welding process of joining two edge portions of the metal plate together.

On the other hand, one or more additional members 7 may be attached to a portion of the plurality of square pipes 60 along an outer side surface of the portion of the plurality of square pipes 60 (see FIG. 2). In this case, it may be required that the additional members 7 are attached with high positional accuracy.

For example, the additional member 7 is a sheet metal member manufactured by one or both of bending and drilling of a metal plate.

In the present embodiment, the structure 6 includes a plurality of additional members 7 each attached to a portion of the plurality of square pipes 60 (see FIG. 2). The additional members 7 are each fixed to a portion of the plurality of square pipes 60 by welding or screws.

In the conventional structure, it was difficult to attach the additional member 7 to a portion of a plurality of conventional square pipes with high positional accuracy due to insufficient accuracy of the shape of the outer surface of each of the plurality of conventional square pipes.

In the present embodiment, the structure 6 is configured such that the additional member 7 can be attached to the outer side surface of a portion of the plurality of square pipes 60 with high positional accuracy. Hereinafter, the configuration will be described.

[Configuration of Each Square Pipe 60]

Figure 3:
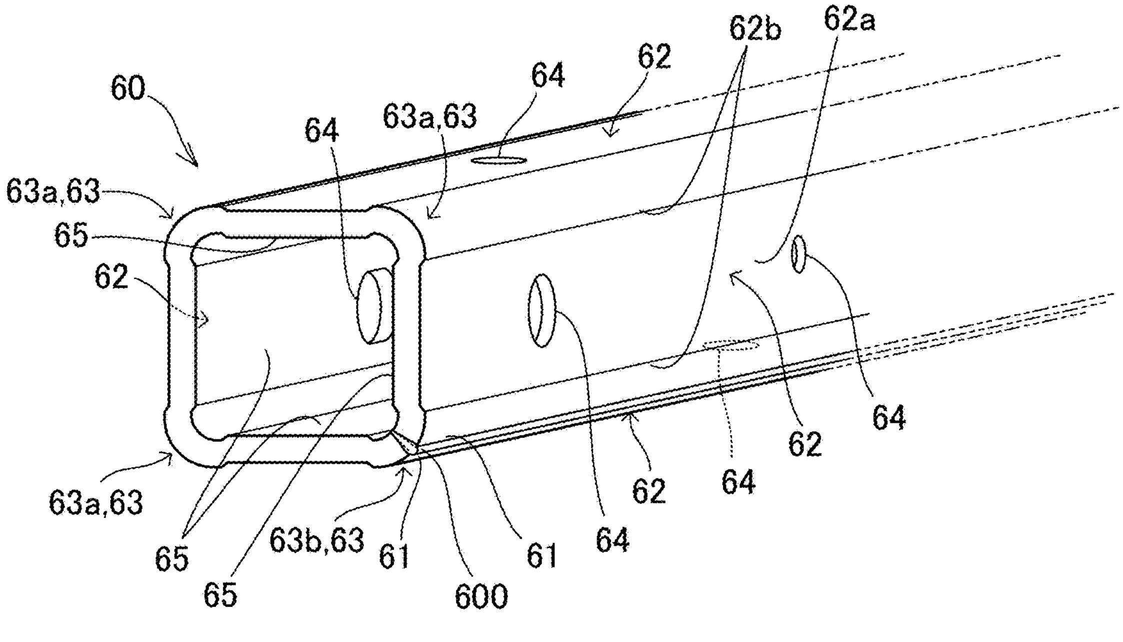
FIG. 3 is a perspective view of one of square pipes in the structure according to the embodiment.

The plurality of square pipes 60 each have four outer side surfaces 62 and four corner portions 63 (see FIG. 3). The four outer side surfaces 62 and the four corner portions 63 are formed to extend in the longitudinal direction of each of the square pipes 60.

The four corner portions 63 include three first corner portions 63*a* and one second corner portion 63*b*. The three first corner portions 63*a* are three bent portions formed by bending a single metal plate. The second corner portion 63*b* includes two edge portions 61 of the metal plate and a welded portion 600 where the two edge portions 61 are joined.

The two edge portions 61 and the welded portion 600 are formed to extend in the longitudinal direction of each of the square pipes 60.

Each of the square pipes 60 has a plurality of through-holes 64 formed in one or more of the four outer side surfaces 62 (see FIG. 3). The processing of the plurality of through-holes 64 in the plurality of square pipes 60 is performed on a flat metal plate before being bent.

Some or all of the plurality of through-holes 64 are used for mounting components. For example, each component is directly mounted on one of the outer side surfaces 62 of each of the square pipes 60 by fixing members, such as screws, which are inserted into the through-holes 64.

In the present embodiment, the image reading unit 2, the paper sheet conveying device 3, and the printing portion 4 are mounted on the structure 6 by the fixing members inserted into the through-holes 64.

It is conceivable that two or more of the plurality of square pipes 60 may be of the same type of member for commonality of components. In this case, some of the plurality of through-holes 64 may not be used for mounting components in some of the plurality of square pipes 60 of the same type.

In each of the square pipes 60, none of the four outer side surfaces 62 includes the welded portion 600. Therefore, it is easy to form one or more through-holes 64 in each of the four outer side surfaces 62 of each of the square pipes 60.

For example, four or more through-holes 64 are formed in the four outer side surfaces 62 of at least one of the plurality of square pipes 60 (see FIG. 3).

In each of the square pipes 60, two out of the four outer side surfaces 62 are formed between the three first corner portions 63*a*. The remaining two of the four outer side surfaces 62 are formed between two of the three first corner portions 63*a* and the second corner portion 63*b*.

Since the square pipe 60 as shown in FIG. 3 is employed in the structure 6, all of the four outer side surfaces 62 of each of the square pipes 60 can be used for mounting components.

In the present embodiment, the three first corner portions 63*a* have a chamfered shape (see FIG. 3). In addition, the two edge portions 61 of the metal plate in the second corner portion 63*b* are bent to form a chamfered shape.

In each of the square pipes 60, the welded portion 600 may be formed so as to slightly protrude from the gap between the two edge portions 61. Even in such a case, the two edge portions 61 have a chamfered shape, so that the welded portion 600 does not interfere with the component mounted on each of the two outer side surfaces 62 adjacent to the second corner portion 63*b*.

Figure 4:
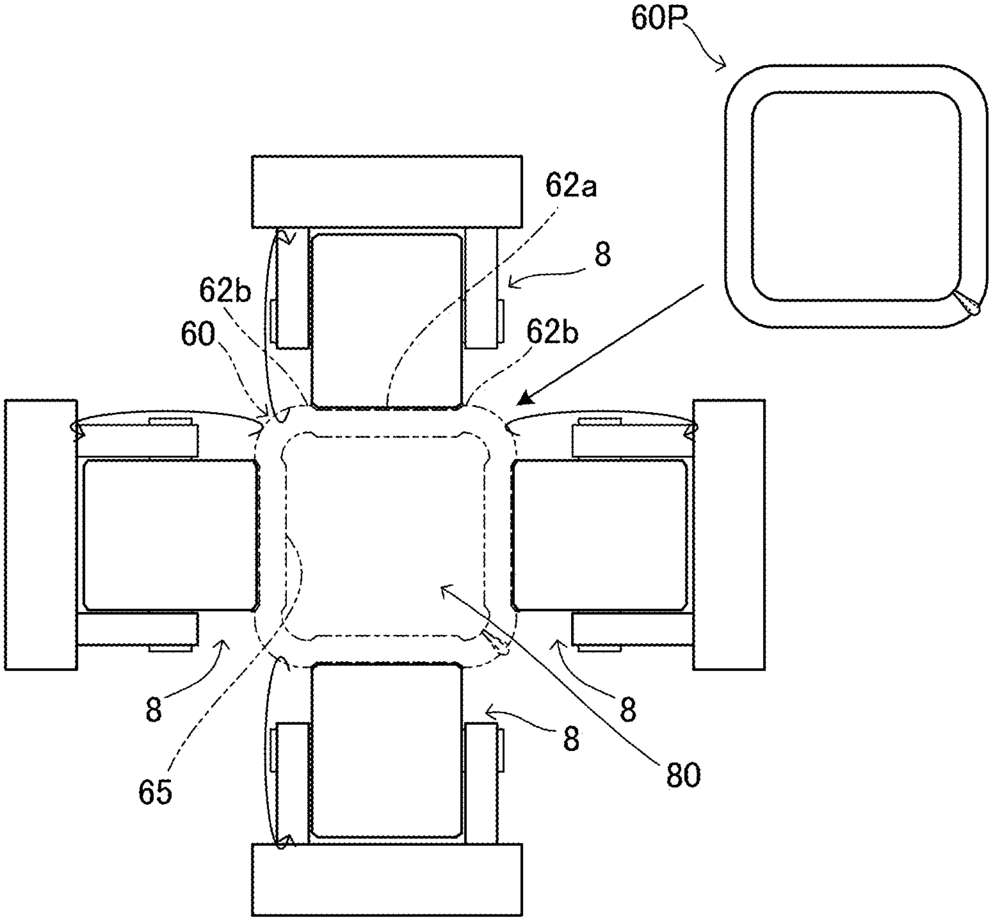
FIG. 4 shows a part of a manufacturing process of the square pipes in the structure according to the embodiment.

Each of the four outer side surfaces 62 of each of the plurality of square pipes 60 has a groove portion 62*a* and a pair of ridge line portions 62*b* (see FIG. 3 and FIG. 4).

The groove portion 62*a* is a concave portion formed along the longitudinal direction of each of the plurality of square pipes 60. The pair of ridge line portions 62*b* form the edge portions on both sides of the groove portion 62*a*. The pair of ridge line portions 62*b* are also formed along the longitudinal direction of each of the plurality of square pipes 60.

The pair of ridge line portions 62*b* form a pair of top portions between a pair of step portions and a pair of corner portions 63 on both sides of the groove portion 62*a*. Each of the plurality of square pipes 60 has four groove portions 62*a* and four pairs of ridge line portions 62*b* corresponding to the four outer side surfaces 62.

For example, the step between each groove portion 62*a* and the pair of ridge line portions 62*b* on both sides of the groove portion 62*a* is about 0.3 mm to 0.8 mm.

In the following description, the square pipe before the groove portions 62*a* and the pair of ridge line portions 62*b* of the four outer side surfaces 62 are formed will be referred to as an original square pipe 60P (see FIG. 4).

As shown in FIG. 4, the groove portion 62*a* and the pair of ridge line portions 62*b* of each of the four outer side surfaces 62 of each of the plurality of square pipes 60 are formed by a roll press in which the original square pipe 60P is passed between four pressure rollers 8.

Two of the four pressure rollers 8 and the remaining two pressure rollers 8 are arranged to face each other with a molding space 80 into which the original square pipe 60P is inserted interposed therebetween. The four pressure rollers 8 are fixed at predetermined positions.

When the original square pipe 60P is passed through the molding space 80, the four pressure rollers 8 rotate while making pressure contact with the four outer side surfaces of the original square pipe 60P. Thus, four groove portions 62*a* corresponding to the surface shapes of the four pressure rollers 8 are formed on the four outer side surfaces of the original square pipe 60P.

In addition, at the same time that the four groove portions 62*a* are formed, a pair of ridge line portions 62*b* are formed on both sides of each of the four groove portions 62*a*.

Further, when the roll press is performed, the inner side surfaces of the original square pipe 60P are not restrained. Therefore, the four inner side surfaces 65 of each of the plurality of square pipes 60 are formed so as to convex inward, corresponding to the four groove portions 62*a* (see FIG. 3 and FIG. 4).

Even when the dimensional accuracy of the four outer side surfaces of the original square pipe 60P is not sufficient, the dimensional accuracy of the four groove portions 62*a* and the four pairs of ridge line portions 62*b* in the square pipe 60 after molding is high.

Figure 5:
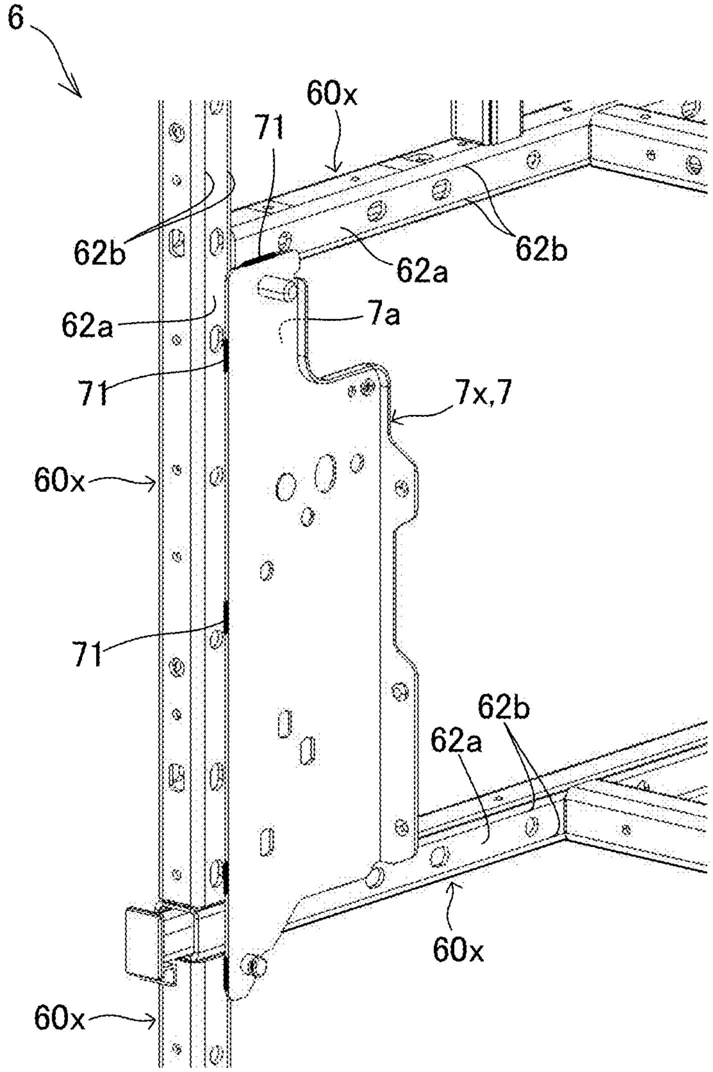
FIG. 5 is a perspective view of a plurality of first target pipes and a first additional member in the structure according to the embodiment.
Figure 6:
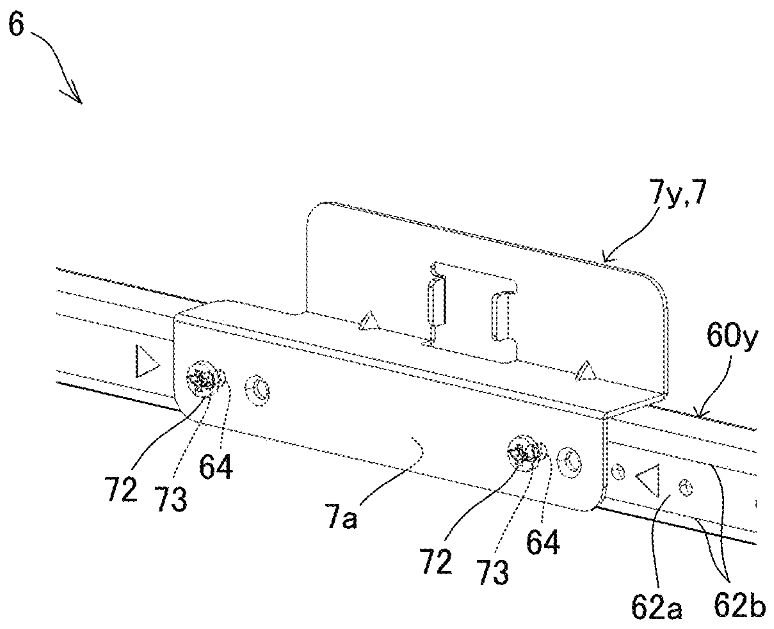
FIG. 6 is a perspective view of a second target pipe and a second additional member in the structure according to the embodiment.

On the other hand, each of the additional members 7 has a contact plane 7*a* which is a plane in contact with a portion of the plurality of square pipes 60 of the structure 6 (see FIG. 5 and FIG. 6). Hereinafter, two types of members of the additional members 7 will be referred to as a first additional member 7*x* and a second additional member 7*y*, respectively (see FIG. 2, FIG. 5, and FIG. 6).

Among the plurality of square pipes 60, a plurality of pipes to which the first additional member 7*x* is attached will be referred to as first target pipes 60*x* (see FIG. 5). Similarly, among the plurality of square pipes 60, a pipe to which the second additional member 7*y* is attached will be referred to as a second target pipe 60*y* (see FIG. 6).

The first additional member 7*x* is fixed to the plurality of first target pipes 60*x* with the contact plane 7*a* of the first additional member 7*x* in contact with at least one of the pair of ridge line portions 62*b* of each of the plurality of first target pipes 60*x* (see FIG. 5).

In the example shown in FIG. 5, a plurality of fixing portions 71 of the first additional member 7*x* are welded to the groove portion 62*a* of each of the plurality of first target pipes 60*x*.

When the contact plane 7*a* is in contact with at least one of the pair of ridge line portions 62*b* of each of the plurality of first target pipes 60*x*, a slight gap is formed between the first additional member 7*x* and the groove portion 62*a*. When two members are arranged with a gap of about 0.3 to 0.8 millimeters therebetween, there is no particular problem in welding the two members.

On the other hand, the second additional member 7*y* is fixed to the second target pipe 60*y* with the contact plane 7*a* of the second additional member 7*y* in contact with the pair of ridge line portions 62*b* of the second target pipe 60*y* (see FIG. 6).

In the example shown in FIG. 6, the second additional member 7*y* is fixed to the second target pipe 60*y* by a plurality of screws 72. The plurality of screws 72 are inserted into the plurality of through-holes 73 formed in the second additional member 7*y* and the plurality of through-holes 64 formed in the second target pipe 60*y* (see FIG. 6).

It is noted that a plurality of fixing portions of the second additional member 7*y* may be welded to the groove portion 62*a* of the second target pipe 60*y* (not shown).

The additional member 7 is positioned with high accuracy with the contact plane 7*a* of the additional member 7 in contact with at least one of the pair of ridge line portions 62*b* of a portion of the plurality of square pipes 60.

By employing the structure 6, the additional member 7 can be mounted on the outer side surface 62 of a portion of the plurality of square pipes 60 with high positional accuracy.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A structure including a plurality of joined square pipes and an additional member attached to a portion of the plurality of square pipes, wherein four corner portions of each of the plurality of square pipes include three first corner portions formed by bending a single metal plate, and one second corner portion including two edge portions of the metal plate and a welded portion where the two edge portions are joined, each of four outer side surfaces of each of the plurality of square pipes include a groove portion formed along a longitudinal direction of each of the plurality of square pipes and a pair of ridge line portions forming edge portions on both sides of the groove portion, the additional member includes a contact plane which is a plane in contact with the portion of the plurality of square pipes, the additional member is fixed to a plurality of first target pipes which are some of the plurality of square pipes with the contact plane in contact with at least one of the pair of ridge line portions of each of the plurality of first target pipes, or the additional member is fixed to a second target pipe which is one of the plurality of square pipes with the contact plane in contact with the pair of ridge line portions of the second target pipe, and the additional member is welded to the groove portion of each of the plurality of first target pipes or the groove portion of the second target pipe.

2. A structure including a plurality of joined square pipes and an additional member attached to a portion of the plurality of square pipes, wherein four corner portions of each of the plurality of square pipes include three first corner portions formed by bending a single metal plate, and one second corner portion including two edge portions of the metal plate and a welded portion where the two edge portions are joined, each of four outer side surfaces of each of the plurality of square pipes include a groove portion formed along a longitudinal direction of each of the plurality of square pipes and a pair of ridge line portions forming edge portions on both sides of the groove portion, the additional member includes a contact plane which is a plane in contact with the portion of the plurality of square pipes, the additional member is fixed to a plurality of first target pipes which are some of the plurality of square pipes with the contact plane in contact with at least one of the pair of ridge line portions of each of the plurality of first target pipes, or the additional member is fixed to a second target pipe which is one of the plurality of square pipes with the contact plane in contact with the pair of ridge line portions of the second target pipe, and the groove portion and the pair of ridge line portions of each of the four outer side surfaces of each of the plurality of square pipes are formed by a roll press in which an original square pipe before the groove portion and the pair of ridge line portions of each of the four outer side surfaces are formed is passed between four pressure rollers configured to make pressure contact with four outer side surfaces of the original square pipe.

3. An image forming apparatus comprising:

the structure according to claim 1; and a printing portion mounted on the structure and configured to form an image on a sheet.

4. An image forming apparatus comprising:

the structure according to claim 2; and a printing portion mounted on the structure and configured to form an image on a sheet.

* * * * *